US012431315B2

(12) United States Patent
Schibli et al.

(10) Patent No.: US 12,431,315 B2
(45) Date of Patent: Sep. 30, 2025

(54) CURRENT-LIMITING FUSE

(71) Applicant: SCHURTER AG, Lucerne (CH)

(72) Inventors: Benjamin Schibli, Olten (CH); Guido Signer, Neuenkirch (CH)

(73) Assignee: SCHURTER AG, Lucerne (CH)

( * ) Notice: Subject to any disclaimer, the term of this patent is extended or adjusted under 35 U.S.C. 154(b) by 234 days.

(21) Appl. No.: 17/796,395

(22) PCT Filed: Jan. 30, 2020

(86) PCT No.: PCT/EP2020/052356

§ 371 (c)(1),
(2) Date: Jul. 29, 2022

(87) PCT Pub. No.: WO2021/151498

PCT Pub. Date: Aug. 5, 2021

(65) Prior Publication Data

US 2023/0343540 A1 Oct. 26, 2023

(51) Int. Cl.
*H01H 85/175* (2006.01)
*H01H 85/041* (2006.01)
*H01H 85/08* (2006.01)

(52) U.S. Cl.
CPC ........ *H01H 85/08* (2013.01); *H01H 85/0411* (2013.01); *H01H 85/175* (2013.01); *H01H 2085/0412* (2013.01); *H01H 2085/0414* (2013.01)

(58) Field of Classification Search
CPC ............... H01H 85/0411; H01H 85/08; H01H 85/175–1755; H01H 2085/0412–0414
See application file for complete search history.

(56) References Cited

U.S. PATENT DOCUMENTS

2016/0005563 A1 1/2016 Fukunaga
2016/0172143 A1 6/2016 Yoneda et al.
2017/0236675 A1* 8/2017 Aberin ................. H01H 85/165 337/159
2019/0067964 A1* 2/2019 Kawase ................... H02B 1/20
2020/0006030 A1 1/2020 Yoneda
2022/0102098 A1* 3/2022 Johler ..................... H01H 85/43
2022/0199346 A1* 6/2022 Yoneda ................ H01H 85/165

FOREIGN PATENT DOCUMENTS

EP 3 217 417 A1 9/2017

* cited by examiner

*Primary Examiner* — Jacob R Crum
(74) *Attorney, Agent, or Firm* — Rothwell, Figg, Ernst & Manbeck, P.C.

(57) ABSTRACT

Current-limiting fuse comprising an electrically insulating housing with walls surrounding an interior space, with a first opening and with a second opening opposite to said first opening, and an integrally formed electrical conductor element extending from a first terminal area outside said housing, across said first opening, across said interior space, across said second opening and to a second terminal area outside said housing, wherein said conductor element comprises a melting section of reduced cross-section, said melting section being located in said interior space and being configured to melt, when a predefined maximum allowable electrical current in the conductor element is exceeded, and wherein a first sealing section of the conductor element seals said first opening and wherein a second sealing section of the conductor element seals said second opening. The invention is further directed to a method of manufacturing the current-limiting fuse.

12 Claims, 4 Drawing Sheets

CURRENT-LIMITING FUSE

CROSS REFERENCE TO RELATED APPLICATION

Figure 1:
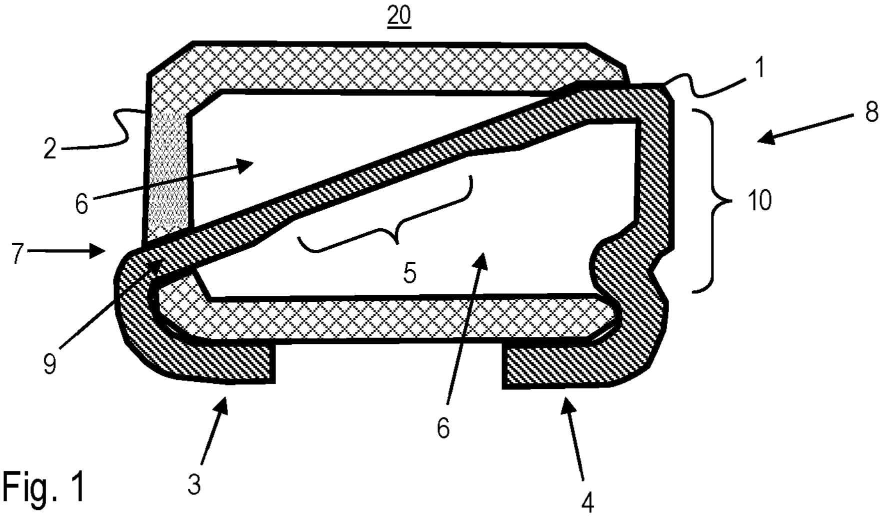

This application is a 35 U.S.C. 371 National Phase Entry Application from PCT/EP2020/052356, filed Jan. 30, 2020, the disclosure of which is incorporated herein by reference in its entirety.

The present invention relates to a current-limiting fuse and to a method of manufacturing a current-limiting fuse.

Current-limiting fuses are protective devices used in broad areas of electrotechnics. Fuses are for example constructed such that current flows through a part of fusible material and the current is interrupted by displacement of the fusible material when this current becomes excessive. It is desired that current-limiting fuses are reliable in the sense that the current is surely interrupted above a predefined maximum allowable electrical current. In addition, the fuse should not interrupt an electrical circuit at lower current values, which correspond to normal operation conditions.

A known type of fuses comprises a tubular insulating housing with electrically conducting end caps on both ends of the tubular housing. A fusible wire extending through the inside of the housing connects the two end caps. The fusible wire is dimensioned such that it melts when a predefined, maximum allowable electrical current flows through the wire. The connection between the wire and the end caps may be prone to failure, i.e. the connection between the wire and the end cap may break at lower current than the rated current. The higher the rated current is, the more difficult is gets to avoid such premature triggering of a fuse with high reliability.

The object of the present invention is to provide an alternative current-limiting fuse avoiding at least a problem of the state of the art. A more specific object of the invention is to provide a current-limiting fuse, which is simple in construction and reliable, in particular reliable in interrupting high-currents.

This object is achieved by a current-limiting fuse according to claim 1.

The current-limiting fuse according to the present invention comprises

- an electrically insulating housing with walls surrounding an interior space, with a first opening and with a second opening opposite to the first opening, and
- an integrally formed electrical conductor element extending from a first terminal area outside the housing, across the first opening, across the interior space, across the second opening and to a second terminal area outside the housing.

The conductor element comprises a melting section of reduced cross-section. The melting section is located in the interior space and is configured to melt, when a predefined maximum allowable electrical current in the conductor element is exceeded. A first sealing section of the conductor element seals the first opening and a second sealing section of the conductor element seals the second opening.

As the conductor element is electrically conducting and integrally formed, the conductor element forms a single-piece fusible element, which at the same time provides the functionality of the terminals of the fuse and which closes the openings of the housing of the fuse. The inventors have recognized that this leads to a fuse that is simple to manufacture and that has high reliability.

The housing of the current-limiting fuse may have no further openings than the mentioned first and second opening. This way, a tube-like topology of the housing results. The housing prevents that drops from the molten melting section damage neighboring elements of the fuse or persons nearby, once the fuse is blown. The housing may be made from material, which may undergo temperature rises as they occur, when the fuse blows.

Embodiments of the present invention aim at applications making use of surface mount technology (SMT). At least in these cases the material of the housing may be selected to withstand a reflow process at a temperature of up to 260° C.

The interior space of the housing may be empty, except from the part of the conductor element crossing the interior space. Alternatively, the interior space may be filled with arc quenching material. An arc quenching material suitable for current-limiting fuses being designed for high maximum allowable electrical currents, such as currents in the 100 Ampère (100 A) range and above, such as up to 2000 Ampère or even up to 10000 Ampère (10 kA), may be sand, in particular quartz sand. Thus, the current-limiting fuse is adapted to be used in a high current or in a ultra-high current regime. The latter current regime may be particularly useful, as in the near future batteries and accumulators having short circuit currents in this range will be available. Nominal currents in the range of 50 A to 500 A and breaking capacity up to 10 kA will be needed in this context and can be provided by a fuse according to the invention.

The terminal areas are spaced from each other and allow to connect the current-limiting fuse in series with an electrical device, which shall be protected from excessive current. The current-limiting fuse has two states, the conducting state and the blown state. In the conducting state, i.e. in the original, not blown state, the conductor element provides electrical contact from the first terminal area to the second terminal area. Once the fuse is blown, i.e. once the melting section of the conductor element is molten due to a current exceeding the predefined maximum allowable electrical current, the electrical connection between the first and the second terminal area are interrupted. The current-limiting fuse according to the invention is a non-resettable fuse, i.e. it will not return to the conducting state. There exists no reset mechanism.

The first terminal area and the second terminal area may be directly formed by the conductor element. Alternatively, they may be covered by a layer, such as e.g. a tin or a silver layer, such that the terminals can be easily connected to a corresponding conductor pad by soldering. As an alternative, means may be provided to connect the terminals to a corresponding conductor by welding, screwing or riveting.

There are different options how the first and second opening of the housing may be sealed or closed by the respective sealing section of the conductor element. For example, an opening may be covered by the respective sealing sections. As another example, the clear cross-section of an opening may be completely filled by the respective sealing section of the conductor element.

The reduced cross-section in the melting section of the conductor element may be realized by a reduced thickness of the conductor element, by a reduced width of the conductor element, by a separation of the conductor element into two or more parallel strips in the region of the melting section or by a combination of the previously discussed possibilities, such as e.g. a local separation into two, three or more parallel running strips, each having a reduced thickness as compared to the thickness of the conductor element before and after the separated section forming the melting section of the fuse. By varying the number of strips and the cross-section of the strips, a current-time-characteristics of the fuse may be varied according to the needs of the desired application.

The term 'integrally formed' as used with respect to the electrical conductor element and as used with respect to the housing in some embodiments, which embodiments will be discussed below, has the meaning 'formed as a single piece'. This means that the conductor element or the housing, respectively, entail a continuous material formation without joints, such as connection points, connection lines or connections faces established e.g. by soldering, welding, or the like, or without mechanically interlocking connections. The integrally formed conductor element may receive its final form e.g. by rolling, cutting, punching, embossing or bending.

The electrical conductor element may consist of a metal, such as copper, or a metal alloy, such as a copper alloy, e.g. a bronze or brass, a silver alloy or an iron alloy, such as stainless steel. Metal alloys suitable for the electrical conductor element and having high or very high electrical conductivity, are found in the group of copper-silver alloys, copper-zirconium alloys, copper-zinc alloy, copper-magnesium alloys, copper-iron alloys, copper-chromium alloys, copper-chromium-zirconium alloys, copper-nickel-phosphorus alloys and copper-tin alloys. Alternative metal alloys suitable for the electrical conductor element and having medium electrical conductivity, are found in the group of copper-nickel-silicon alloys, copper-beryllium alloys, copper-nickel-tin alloys, copper-cobalt-beryllium alloys and copper-nickel-beryllium alloys.

The housing may comprise a polymer. It may consist of a polymer containing a filler increasing the temperature stability of the housing. The housing may consist of a ceramic material. The material of the housing may be selected such that no cracks occur in the housing under thermal shock when the maximum current is reached, particularly suited for this purpose are high performance thermoplastics, in particular high performance polyamides, which are fibreglass-reinforced, such as polymer PA4T-GF30 FR (40).

Embodiments of the current-limiting fuse result from the features of claims 2 to 12.

In one embodiment of the current-limiting fuse according to the invention, the conductor element is a sheet metal.

An outer contour of the conductor element may be formed by punching or cutting, e.g. laser-cutting, the conductor element out of a larger piece of sheet metal. Holes may be drilled into the conductor element as well. A melting section of reduced width or comprising separate parallel running sections may be produced in this step. The thickness of partial area of the sheet metal may be reduced by rolling or pressing, in order to produce a melting section of reduced cross-section. The sheet metal may be bended easily into a final form, e.g. into a form covering the first and/or second opening of the housing. The final position of the terminal areas may be achieved by bending end sections of the sheet metal into the desired position.

The sheet metal may consist of copper, bronze, brass, copper alloys, silver alloys, steel, in particular stainless steel, etc. as discussed above in the context of suitable materials for the conductor element.

In one embodiment of the current-limiting fuse according to the invention, the first terminal area and the second terminal area are coplanar.

Terminal areas being coplanar means that the first terminal area and the second terminal area are arranged spaced from each other in a common imaginary plane. This embodiment is particularly suitable for a fuse designed as surface mountable device (SMD) i.e. suited for leadless application, also denoted as surface mountable technology (SMT). The terminal areas may be arranged on a bottom side of an approximately cuboid shaped housing and facing away from the housing. This way, the current-limiting fuse may be placed on a printed circuit board and the first and second terminal area may be soldered to soldering pads on the printed circuit board by reflow soldering.

Compared to known so-called blade-fuses regularly applied in automotive applications, current-limiting fuses according to the present embodiment have the advantage, that they can be automatically placed on printed circuit boards and that they may be soldered by a standard reflow process, whereas blade-fuse need to be mounted by hand, typically at the very end of the production chain, which leads to relatively high cost.

In one embodiment of the current-limiting fuse according to the invention, the melting section is mechanically self-supporting across the interior space.

With this embodiment, a wire-in-air type current-limiting fuse may be produced. In particular, the melting section may be arranged to diagonally extend across the interior space of the housing. The combination of dimension of the cross-section, of the geometry of the cross-section in the melting section and the material of the conductor element may be matched such that the melting section is mechanically self-supporting.

In one embodiment of the current-limiting fuse according to the invention, the cross-section of the first sealing section of the conductor element corresponds in form and dimension to the cross-section of the first opening. As alternative, or in combination with the previously mentioned embodiment, the cross-section of the second sealing section of the conductor element corresponds in form and dimension to the cross-section of the second opening.

As an example, one of the respective sealing sections may have a rectangular cross-section, e.g. a rectangle defined by the thickness and width of the part of a sheet metal forming the sealing section. This rectangular cross-section may be dimensioned such that it just tightly fits into a rectangular opening of the housing.

In one embodiment of the current-limiting fuse according to the invention, the second sealing section of the conductor element has a protrusion projecting towards the interior space. The protrusion is supported on a contour section of the second opening.

The protrusion may e.g. have the form of a hump with a round basis or of an elongated hump, which hump may be embossed into a sheet metal. As the protrusion is supported on a contour section of the opening, a shift of the sealing section sealing the opening is hindered at least in the direction, in which the protrusion is pressed against the contour section of the opening. This embodiment is particularly suitable in combinations with embodiments having a relatively large opening in the housing which is covered by a respective sealing section of the conducting element. A movement of the sealing section in other directions, which are not hindered by the protrusion, may be blocked e.g. by an angled design of the conductor element extending around an edge of the housing, e.g. to form a terminal area on a face standing orthogonal to a face having the protrusion.

In one embodiment of the current-limiting fuse according to the invention, the walls of the housing, the first sealing section of the conductor element and the second sealing section of the conductor element together form a dust-tight enclosure.

In this embodiment, gaps between the housing and the conducting element are dimensioned small enough that no dust can pass across the gaps. This prevents on the one hand dust particles from entering into the housing from outside the fuse and on the other hand protects the surrounding of the fuse from particles produced as consequence of blowing the fuse. Dust particles typically have diameters in the range 5 micrometers to 100 micrometers. Accordingly, the gap width may be below 5 micrometers, or even as small as 2 micrometers or 1 micrometer, in order to achieve an even higher protection level.

In one embodiment of the current-limiting fuse according to the invention, the cross-section of the second opening is larger than the cross-section of the first opening.

This embodiment is asymmetric with respect to the size of the openings in the housing. It may simplify the assembly of the fuse in that an insertion of the conductor element from the side of the larger of the openings is facilitated. A funnel type geometry of the interior space being designed to guide an end of the conductor element inserted through the larger second opening into and through a more tightly dimensioned first opening may be combined with this embodiment. Due to the larger opening on one side of the housing, the conductor element may be arranged diagonally int the empty space inside the housing. This way, the length of the melting section may be increased compared to a horizontally arranged melting section, and in particular, the melting section may be longer than the longest edge of a cuboid housing.

In one embodiment of the current-limiting fuse according to the invention, at least one groove facing towards the interior space is formed into the housing. In particular, the groove may be formed into a bottom side of the housing, which is adjacent to said first and said second terminal area.

The inventors have recognized that with this embodiment, a very high insulating resistance results between the terminals of the fuse. A current-limiting fuse according to this embodiment thus has a high breaking capacity, in particular for high current applications, i.e. for rated currents up to and above 2000 Ampère.

If there exists a side adjacent to both, the first and second terminal area, in use, this side is normally soldered onto a print, and is often referred to as bottom side. In case that the reduced cross-section in the melting section is formed as two or more parallel strips, the number of grooves may correspond to the number of strips and a separate groove may run parallel and in proximity to each one of the strips. In use, these grooves may be arranged below the melting section, i.e. in direction of gravity with respect to the position of melting section in the conducting state of the fuse. This leads to a particularly high current breaking capacity of the fuse.

In one embodiment of the current-limiting fuse according to the invention, the geometric form of the interior space is defined as the negative of an imaginary core, which is removable in one piece through the second opening.

This means that the interior space of the housing, including a groove or several grooves, in case of an embodiment having grooves as discussed above, has this geometric form. The housing may be manufactured as injection-molded polymer part or as sintered ceramic part using an integrally formed core as part of a molding form or as part of a sintering form, respectively. The present embodiment leads to the advantage that the integrally formed core is removable in one piece and in such a way that the core is reusable. The geometric form is described by referring to an imaginary core, as no core is actually part of the resulting housing.

In one embodiment of the current-limiting fuse according to the invention, the housing is integrally formed.

This embodiment has the advantage of simple and low-cost production of the housing. Furthermore, an integrally formed housing has reduced risk of breaking apart under the heat shock created when the fuse blows. Thus, the present embodiment is particularly suited for high current applications, i.e. for rated currents up to and above 2000 Ampère.

In one embodiment of the current-limiting fuse according to the invention, the current-limiting fuse consists of the housing and the conductor element.

The inventors have recognized that the current-limiting fuse according to the invention may be realized in a very simple configuration making use of only two elements, namely an electrically non-conductive housing and an electrically conductive element surrounded by the housing at least in the region of the melting section. Surprisingly, even in this simple configuration, an interior space of the housing can be properly sealed, and the two parts can be properly attached to each other.

Features of the embodiments discussed above may be combined as long as they do not contradict each other.

A method of manufacturing a current-limiting fuse according to the invention comprises the steps:

a) providing an integrally formed electrically insulating housing with walls surrounding an interior space, with a first opening and with a second opening opposite to the first opening,
b) providing an electrically conducting, integrally formed conductor element comprising a melting section of reduced cross-section,
c) introducing the conductor element through the first opening or through the second opening, thus far that the melting section is located in the interior space, and
d) bending the conductor element to form a first terminal area and a second terminal area outside the housing, thereby sealing the first opening by a first section of the conductor element and sealing the second opening by a second section of the conductor element.

A variant of the method results from the features of claim 14.

In this variant of the method, the conductor element provided in step a) is a sheet metal having a protrusion embossed. The sheet metal has a first bending edge delimiting the first terminal area. The sheet metal has a second bending edge spaced from the protrusion by a distance allowing a tight fit of the bending edge and the protrusion between opposite inner contours of said second opening. The sheet metal, as provided in step a), is flat in the region between said second bending edge and the end opposite to the first terminal area.

In this variant of the method, the step c) of introducing the conductor element comprises feeding the flat region of the conductor element, i.e. the sheet metal, from the interior space through the first opening.

In this variant of the method, the step d) comprises establishing a third bending edge delimiting the second terminal area and then establishing a fourth bending edge in proximity to the first opening.

After applying the additional bending steps of step d), the previously flat region of the sheet metal is bent and a backward moving of the sheet metal is prevented. This way, the housing and the conductor element build a mechanically stable unit.

Figure 2:
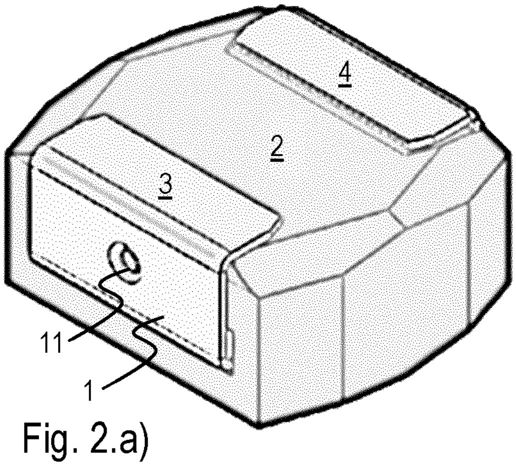
Figure 2:
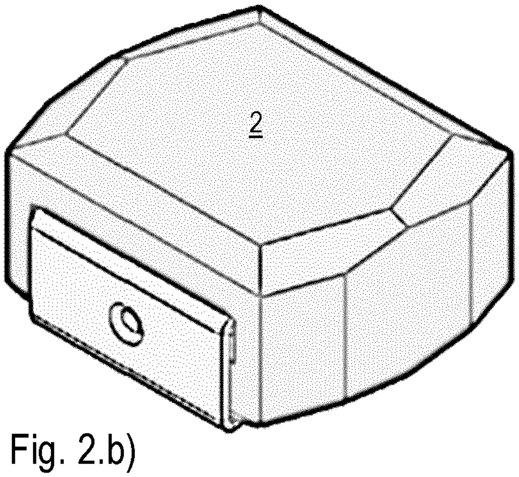
Figure 3:
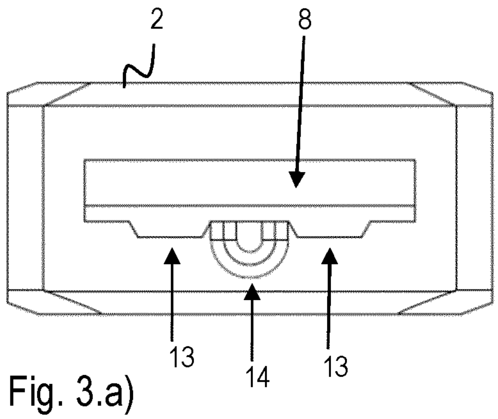
Figure 3:
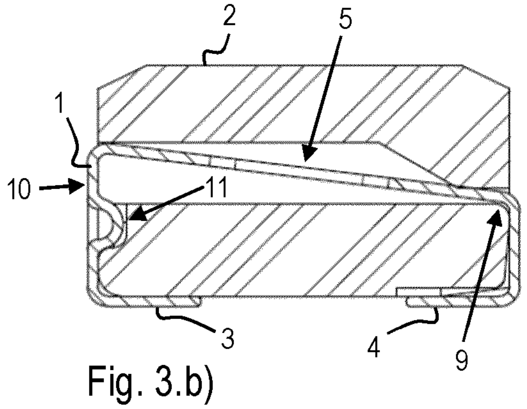
Figure 3:
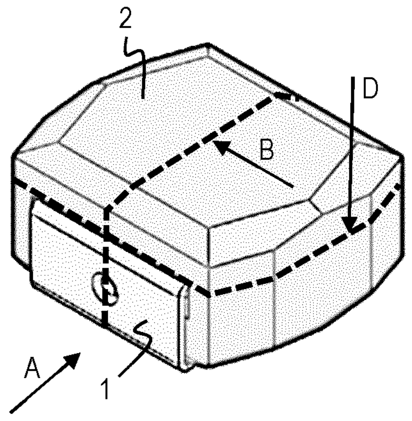
Figure 3:
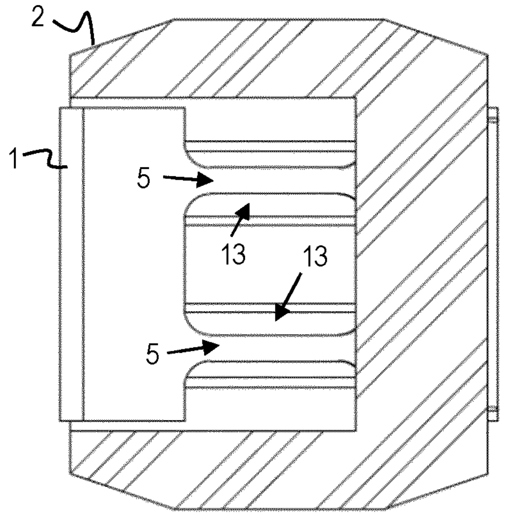
Figure 4:
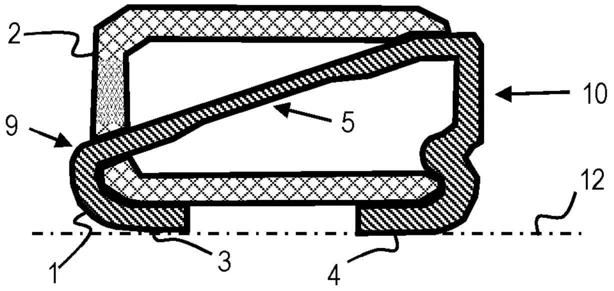
Figure 4:
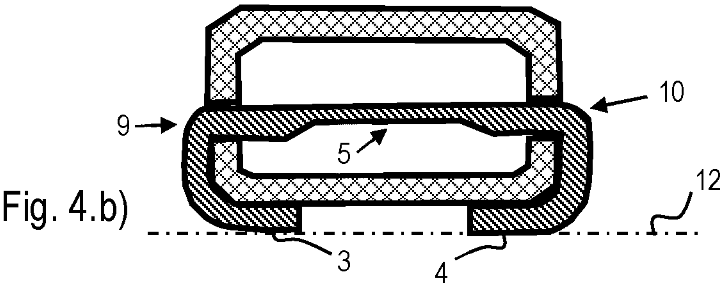
Figure 4:
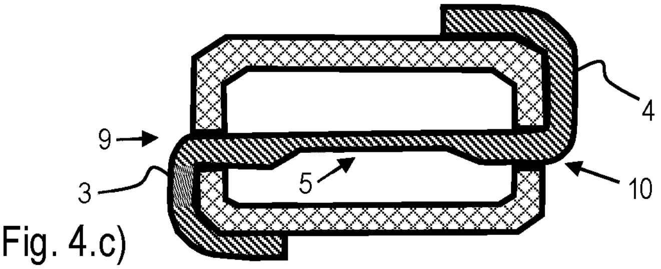
Figure 5:
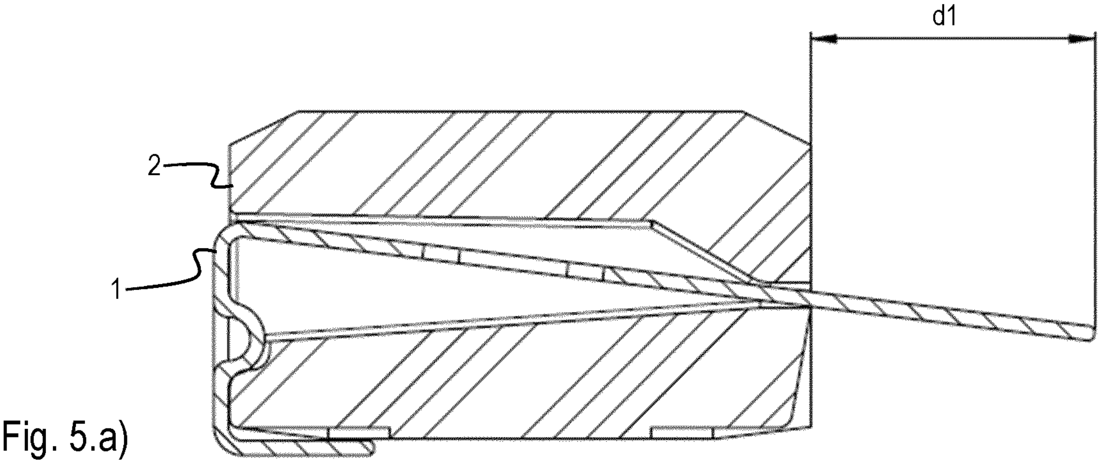
Figure 5:
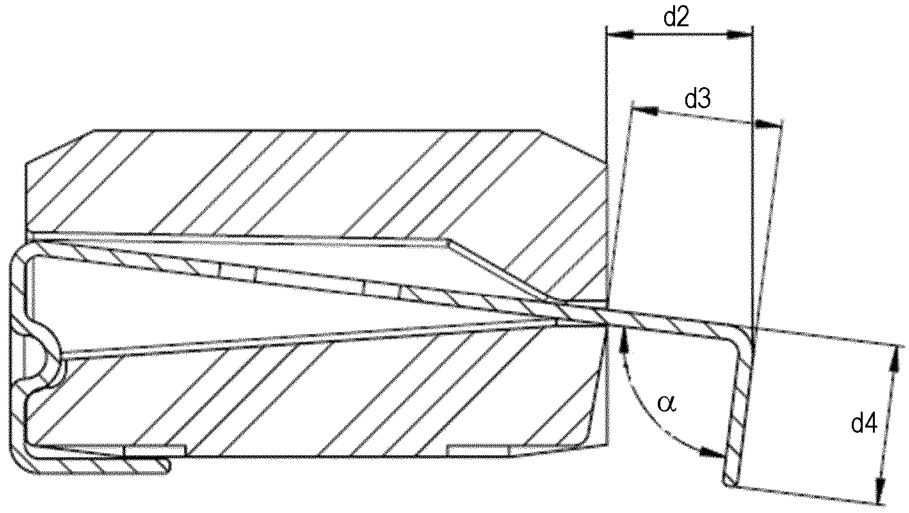
Figure 5:
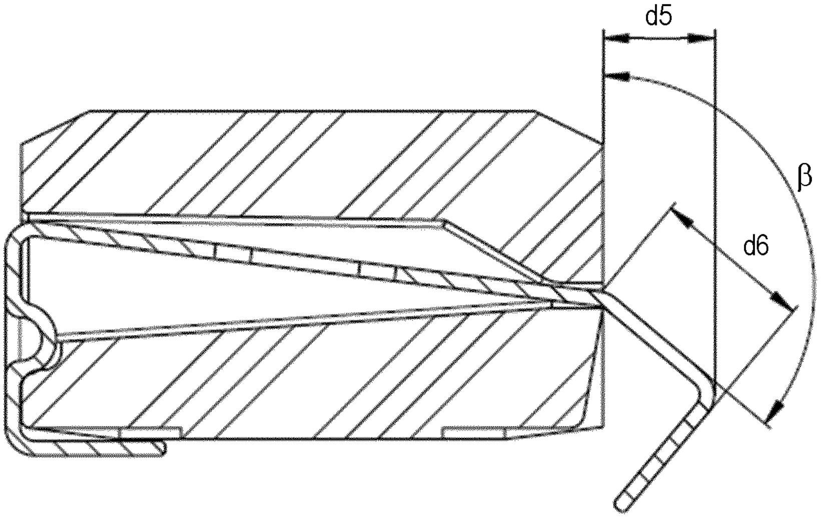

The invention shall now be further exemplified with the help of figures. The figures show:

FIG. 1 a cross-section through a current-limiting fuse according to the invention;

FIG. 2.*a*) and 2.*b*) perspective views of an embodiment of the current-limiting fuse;

FIG. 3.*a*) to 3.*d*) different views of an embodiment of the current-limiting fuse, FIG. 3.*a*) a side-view, FIG. 3.*b*) a cross-section, FIG. 3.*c*) a perspective view, FIG. 3.*d*) another cross-section;

FIG. 4.*a*) to 4.*c*) cross-sections across three different embodiments of the current-limiting fuse;

FIG. 5.*a*) to 5.*c*) cross-sections showing three different states during manufacturing of an embodiment of the current-limit fuse as displayed in FIG. 3.

FIG. 1 shows schematically and simplified, a cross-section through a current-limiting fuse 20 according to the invention. The fuse comprises conductor element 1, which is displayed diagonally hatched, and a housing 2, which is displayed with cross-hatching. The housing is an electrically insulating housing 2 with walls surrounding an interior space 6. The housing has a first opening 7 and a second opening 8 opposite to the first opening.

The conductor element 1 is an integrally formed electrical conductor element. A first terminal area 3 and a second terminal area 4 are outside the housing. A melting section 5 of reduced cross-section, here shown as reduced thickness, forms a middle section of the conductor element. The melting section is configured to melt, when a predefined maximum allowable electrical current in the conductor element is exceeded. The reduction of the cross-section may not only be achieved by a reduction in thickness, but also by reductions of the cross section of the cross-section not visible in this figure.

The conductor element is formed as one piece that extends from said first terminal area, across the first opening 7 of the housing, across the interior space 6 of the housing, across the second opening 8 of the housing and finally to the second terminal area 4. The openings of the housing are sealed by sections of the conductor element. A first sealing section 9 of the conductor element seals the first opening 7. A second sealing section 10 of the conductor element seals the second opening 9. In the version shown here, the first sealing section simply fills the whole opening 7. The second opening 8 is larger than the first opening 7. The second opening is covered by the second sealing section 10. In the version shown here, the sealing section of the conductor element is held in this position due to the specific geometry of the conductor element, which prevents a movement in up/down direction, wherein up and down refer to the directions in the present figure.

FIG. 2.*a*) shows a perspective view of an embodiment of the current-limiting fuse with a specific design of the housing 2 and the conductor element 1. The housing, as well as the complete fuse, have an approximately cuboid shape. The housing has chamfered edges. The housing has two larger extensions, a width and a length, and a smaller extension, in this case the height. A protrusion 11 is embossed into the conductor element 1, which is in this embodiment formed as a sheet metal. The function of this protrusion will be explained further in context of the next figure. The terminal areas 3 and 4 are visible in FIG. 2.*a*). FIG. 2.*b*) shows the same fuse as FIG. 2.*a*) but turned upside down in a position, as it could be placed on a printed circuit board. The embodiment shown here is formed as an SMD-fuse suitable for reflow soldering.

FIG. 3.*a*) to 3.*d*) show views of the same embodiment as shown in FIG. 2.*a*) and FIG. 2.*b*). FIG. 3.*c*) illustrates the directions of view and the position of the cutting planes of the views according to FIGS. 3.*a*), 3.*b*) and 3.*d*). FIG. 3.*a*) shows a side view onto the housing 2 alone, i.e. without the conductor element. The viewing direction is indicated by the arrow A in FIG. 3.*c*), which indicates a longitudinal direction of the fuse. A view into the second opening 8 of the housing is possible here. A recess 14 is formed proximate to a contour of the opening 8. The recess is formed near the middle of the opening and corresponds in form and dimension to the protrusion 11 of the conductor element 1, see FIG. 3.*b*) and FIG. 3.*c*. The combination of the recess 14 and the protrusion 11 lead to a form-fitting connection preventing with very simple means unwanted relative movement between the conductor element and the housing. Two grooves 13 of trapezoidal cross-section are formed on the bottom side of the interior space of the housing. The two grooves extend in longitudinal direction. FIG. 3.*b*) shows a cross-section along a middle plane of the fuse. The view direction of this figure is indicated by arrow B in FIG. 3.*c*), which corresponds to a lateral direction of the fuse. The conductor element 1 leads across the housing 2 and forms terminal areas 3 and 4 outside the housing. The opening of the housing shown on the right side in this figure is a rectangular opening, which is completely filled by the thickness of the conductor element, such that the opening is sealed. The conductor element forms a first sealing section 9 in this region. The larger opening of the housing, shown on the left side in this figure, is covered by the second sealing section 10. The protrusion 11 together with the angled section at the upper side of the second sealing section 10 and together with the angled section adjacent to the first terminal area 3 hold the sealing section in place with respect to a lateral and a height position of the housing. The melting section 5 of the conductor element is formed as two parallel strips with significantly reduced width as compared to the width of the conductor element before and after the melting section 5. In the embodiment shown, the cross-section of conducting material in the melting section is reduced to approx. 15% of the full cross-section. FIG. 3.*d*) shows a cut-away view from a top-direction as indicated by arrow D in FIG. 3.*c*). The cutting plane is a horizontal plane, lying just below the ceiling of the interior space of the housing. The conductor element 1 is seen from top. On the left side in the figure, the conductor element 1 has full width and full cross-section. A cut-out in the middle and cut-outs on both sides reduce the conducting element to two parallel strips, which form the melting section 5 of the conductor element. Each of the two strips runs parallel to one of the grooves 13. On the right side of the figure the cutting plane crosses a wall of the housing. As can be seen in FIG. 3.*b*), the interior space of the housing has a funnel-shaped form in this region.

FIG. 4.*a*) shows an embodiment of the current-limiting fuse corresponding to the embodiment in FIG. 1. The conductor element 1 as well as its melting section 5 extend diagonally across the interior space of the housing. The first 3 and second 4 terminal area are coplanar, i.e. the lie in a common imaginary plane 12, indicated by a dash-dotted line in the present cross-section. This embodiment is suitable as SMD-fuse.

FIG. 4.*b*) shows a variant of the embodiment having two openings of approximately equal size. The conductor element runs horizontally across the interior space. The terminal parts are bent to the same side, such that also in this variant, both terminal areas 3, 4 lie in a common imaginary plane 12.

FIG. 4.*c*) shows a further variant, this time with terminal parts bent to different sides of the fuse. This way, terminal areas 3, 4 are defined on opposite sides of the fuse, such that it can be used like a cartridge fuse.

FIG. 5.*a*) shows the state after inserting a conductor element 1 of preliminary form into the housing 2. The bending edges on the left side, as well as the embossed protrusion may be prepared before the insertion step. In the state shown, both openings of the housing are sealed already. A flat part of the sheet metal forming the conductor element protrudes by a distance d1 out of the housing on the right side in the figure.

FIG. 5.*b*) shows the state after an additional bending step. The position of the further bending edge and the angle may be specified by the distances d2, d3, d4 and the angle α, see table below.

FIG. 5.*c*) shows an optional intermediate state after a further bending step and before bringing the second terminal into its final position on the bottom side of the housing. A further bending edge is produced in close proximity to the smaller opening of the housing on the right side in the present figure. The geometry is specified by the distances d5 and d6 as well as the angle β, see table below.

As an example, the following distances and angles may be applied:

| d1 (mm) | d2 (mm) | d3 (mm) | d4 (mm) | d5 (mm) | d6 (mm) | α | β |
|---|---|---|---|---|---|---|---|
| 3.91 | 2.01 | 2.07 | 2.2 | 1.53 | 2.19 | 90° | 130° |

Angle α may be deliberately made slightly smaller than a right angle, e.g. 0.5° to 3° smaller, such that a press-fit is achieved once the terminal part is in its final position on the lower side of the fuse.

List of Reference Signs

1 conductor element
2 housing
3 first terminal area
4 second terminal area
5 melting section
6 interior space
7 first opening (of the housing)
8 second opening (of the housing)
9 first sealing section (of the conductor element)
10 second sealing section (of the conductor element)
11 protrusion (of the conductor element)
12 imaginary plane (comprising both terminal areas)
13 groove
14 recess
20 current-limiting fuse
d1, d2, d3, d4, d5, d6 dimensions used for defining the bending process according to an embodiment
α, β angles used for defining the bending process according to an embodiment

The invention claimed is:

1. A current-limiting fuse comprising:

an electrically insulating housing with walls surrounding an interior space, with a first opening and with a second opening opposite to said first opening, and an integrally formed electrical conductor element extending from a first terminal area outside said housing, across said first opening, across said interior space, across said second opening and to a second terminal area outside said housing, wherein said conductor element comprises a melting section of reduced cross-section, said melting section being located in said interior space and being configured to melt, when a predefined maximum allowable electrical current in the conductor element is exceeded, and wherein a first sealing section of the conductor element seals said first opening and wherein a second sealing section of the conductor element seals said second opening, wherein said second sealing section of the conductor element has a protrusion projecting towards said interior space, and the protrusion is supported on a contour section of said second opening, wherein said conductor element is formed from a sheet metal, wherein said protrusion is embossed into said sheet metal, and wherein said sheet metal has a bending edge spaced from said protrusion by a distance allowing a tight fit of said bending edge and said protrusion between opposite inner contours of said second opening, thus providing said second sealing section.

2. The current-limiting fuse according to claim 1, wherein said first terminal area and said second terminal area are coplanar.

3. The current-limiting fuse according to claim 1, wherein said melting section is mechanically self-supporting across said interior space.

4. The current-limiting fuse according to claim 1, wherein the cross-section of said first sealing section of the conductor element corresponds in form and dimension to the cross-section of said first opening and/or wherein the cross-section of said second sealing section of the conductor element corresponds in form and dimension to the cross-section of said second opening.

5. The current-limiting fuse according to claim 1, wherein said walls of said housing, said first sealing section of said conductor element and said second sealing section of said conductor element together form a dust-tight enclosure.

6. The current-limiting fuse according to claim 1, wherein the cross-section of said second opening is larger than the cross-section of said first opening.

7. The current-limiting fuse according to claim 1, wherein at least one groove facing towards said interior space is formed into said housing.

8. The current-limiting fuse according to claim 1, wherein the geometric form of said interior space is defined as the negative of an imaginary core, which is removable in one piece through the second opening.

9. The current-limiting fuse according to claim 1, wherein said housing is integrally formed.

10. The current-limiting fuse according to claim 1, wherein the current-limiting fuse consists of said housing and said conductor element.

11. A method of manufacturing a current-limiting fuse, said method comprising:

a) providing an integrally formed electrically insulating housing with walls surrounding an interior space, with a first opening and with a second opening opposite to said first opening, b) providing an electrically conducting, integrally formed conductor element comprising a melting section of reduced cross-section, c) introducing the conductor element through said first opening or through said second opening, such that said melting section is located in the interior space, and d) bending said conductor element to form a first terminal area and a second terminal area outside said housing, thereby sealing said first opening by a first sealing section of said conductor element and sealing said second opening by a second sealing section of said conductor element, wherein said conductor element provided in step b) is a sheet metal having a protrusion embossed, wherein the sheet metal has a first bending edge delimiting said first terminal area, wherein the sheet metal has a second bending edge spaced from said protrusion by a distance allowing a tight fit of the second bending edge and the protrusion between opposite inner contours of said second opening, wherein the sheet metal includes a flat region between said second bending edge and the end opposite to the first terminal area, wherein the step c) of introducing the conductor element comprises feeding said flat region of the conductor element from the interior space through said first opening, wherein the step d) comprises establishing a third bending edge delimiting said second terminal area and then establishing a fourth bending edge in proximity to said second opening.

12. The current-limiting fuse according to claim 7, wherein said groove is formed into a bottom side of the housing, said bottom side being adjacent to said first and said second terminal area.

* * * * *